(12) United States Patent
Cho et al.

(10) Patent No.: US 6,268,949 B1
(45) Date of Patent: Jul. 31, 2001

(54) OPTICAL INTENSITY MODULATOR AND FABRICATION METHOD USING AN OPTICAL WAVEGUIDE HAVING AN ARC SHAPED PATH

(75) Inventors: Jung-hwan Cho, Seoul; Dug-bong Kim, Pusan; Sang-yun Yi, Yongin; Tae-hyung Rhee, Sungnam, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/344,125

(22) Filed: Jun. 24, 1999

(30) Foreign Application Priority Data

Jun. 26, 1998 (KR) .................................................. 10-24411

(51) Int. Cl.⁷ ...................................................... G02F 1/03
(52) U.S. Cl. ............................................ 359/254; 359/245
(58) Field of Search .................................... 359/254, 245, 359/244, 237, 238, 239

(56) References Cited

U.S. PATENT DOCUMENTS 4,145,121  3/1979  Hata et al. .

FOREIGN PATENT DOCUMENTS

| 59-41167 | 10/1984 | (JP) . |
|---|---|---|
| 61-210321 | 9/1986 | (JP) . |
| 4-237031 | 8/1992 | (JP) . |
| 5-264938 | 10/1993 | (JP) . |
| 6-59223 | 3/1994 | (JP) . |
| 6-186513 | 7/1994 | (JP) . |
| 6-214274 | 8/1994 | (JP) . |
| 7-84226 | 3/1995 | (JP) . |
| 8-122718 | 5/1996 | (JP) . |
| 9-318978 | 12/1997 | (JP) . |
| 10-90637 | 4/1998 | (JP) . |

*Primary Examiner*—Hung Xuan Dang
(74) *Attorney, Agent, or Firm*—Robert E. Bushnell, Esq.

(57) ABSTRACT

In an optical intensity modulator, and a fabrication method thereof, the optical intensity modulator includes a substrate made of a predetermined material, an arc shaped optical waveguide formed on the substrate, and an electrode formed on the optical waveguide such that the electrode is in alignment with the optical waveguide, the refractive index of the optical waveguide being changed in accordance with an intensity of an electric field applied to the electrode, and an optical wave passing a predetermined location of the optical waveguide being radiated into the substrate due to the changed refractive index. Accordingly, a large modulation depth can be obtained from only a small refractive index variation by using the radiation loss characteristics of the arc shaped waveguide.

21 Claims, 10 Drawing Sheets

OPTICAL INTENSITY MODULATOR AND FABRICATION METHOD USING AN OPTICAL WAVEGUIDE HAVING AN ARC SHAPED PATH

CLAIM OF PRIORITY

This application makes reference to, incorporates the same herein, and claims all benefits accruing under 35 U.S.C. §119 from my application OPTICAL INTENSITY MODULATOR AND FABRICATION METHOD THEREFOR filed with the Korean Industrial Property Office on Jun. 26, 1998 and there duly assigned Ser. No. 24411/1998.

BACKGROUND OF THE INVENTION

1. Field of the Invention

The present invention relates to an optical intensity modulator and a fabrication method therefor, and more particularly, to an optical intensity modulator having a curved optical waveguide, and its fabrication method.

2. Description of the Related Art

An integrated optical technique means fabrication of several optical devices comprising optical waveguides within one substrate. When using integrated optical techniques, the arrangement of unit optical devices is easy. Thus, a complicated multi-functional device can be easily fabricated in a small area. An optical modulator is one of these integrated optical devices. The optical modulator controls the phase or intensity of an optical wave propagating along an optical waveguide using an external signal. Integrated optical modulators use the electro-optical effect or thermo-optical effect of a medium for forming optical waveguides. Representative electro-optical materials include, for example, a semiconductor (GaAs, InP), a ferroelectric substance ($LiNbO_3$, $LiTaO_3$), and a poled polymer. When an electrical field is applied to these materials in one direction, the refractive index of the material in the electrical field direction and in the vertical direction thereto varies. Since a refractive index variation means a change in the phase of optical waves propagated within a medium, phase modulation and intensity modulation can be achieved using this change. In optical modulators using the electro-optical effect, a capacitor-type electrode is formed near an optical waveguide and then a voltage is applied to the capacitor-type electrode to apply an electrical field to the optical waveguide. In contrast with the electro-optical effect, the thermo-optical effect is possessed by almost all optical materials. When the temperature of a material varies, the refractive index of the material is changed due to contraction or expansion of the volume of the material depending on the variation of the material temperature. Accordingly, similar to the electro-optical effect, the thermo-optical effect can be used to obtain phase modulation and intensity modulation of optical waves. In optical modulators using the thermo-optical effect, a micro-heater is fabricated near an optical waveguide, and then a current is applied to the micro-heater to apply heat to the optical waveguide. Since the thermo-optical effect is shown in almost all optical materials, there are various materials to choose from. Also, modulation characteristics can be obtained independent of the polarization of optical waves. However, the thermo-optical effect has a very slow time response property (~1 msec) compared with the electro-optical effect. Thus, thermo-optical modulators are generally applied to applications requiring a polarization independent feature rather than being used for high-speed optical signal data transmission.

Integrated optical modulators are roughly divided into intensity modulators using phase modulation, and cutoff optical modulators directly obtaining optical intensity modulation. A Mach-Zehnder interferometric modulator is representative of an intensity modulator using phase modulation. Such an optical modulator is comprised of a substrate, an optical waveguide, and electrodes. The operation of this modulator is described as follows. Light input into the optical waveguide is divided in two, and the two divided light beams are differentially phase-modulated by external electrical fields applied to the electrodes while passing through different paths. If the two optical waves are in-phase at the output end of the optical waveguide, they constructively interfere with each other, so that input optical power is output almost without change. If the two optical waves are out-of-phase, they destructively interfere with each other, so that the optical waves are radiated into the substrate. Thus, output optical power becomes zero.

The cutoff optical modulator is representative of a cutoff optical modulator which directly obtains optical intensity modulation, and is comprised of a substrate, an optical waveguide, and electrodes. The operation thereof is described as follows. When a large voltage is applied to electrodes placed on parts of the optical waveguide, the refractive index of the optical waveguide is changed. When the optical waveguide is cut off by the changed refractive index, guided optical waves are radiated into the substrate, and the output becomes zero.

The interferometric optical intensity modulator using phase modulation requires only phase modulation of light, so that the driving voltage is low, and a well-guiding condition of the optical waveguide can be set. Therefore, the insertion loss of the device is small. However, this interferometric optical modulator complicates the configuration of an optical communications system because of sinusoidal output characteristics with respect to the applied voltage. Also, since the operating point of the optical modulator is sensitive to a change in external factors, for example, temperature, humidity or pressure, many extra devices are required to monitor and compensate for the operating point of the optical modulator. This causes an increase in the cost for constituting an optical transmission system.

The cutoff modulator can solve some of the defects of the above-described interferometric optical modulator. The operating point of the cutoff optical modulator can be set optically, so that a direct current bias for setting the operating point is not required. Accordingly, an operating point drifting phenomenon with respect to the external factors is so small that the cutoff modulator can be used in the optical transmission systems without special extra devices. Also, the cutoff optical modulator exhibits linear output characteristics with respect to the applied voltage, so that it has a wide dynamic range of operation. Thus, the cutoff optical modulator is useful particularly with analog communications systems. In addition, digital output characteristics can be obtained in the guiding conditions of a specific optical waveguide, so that the cutoff optical modulator can be easily applied to digital communications without extra signal processing devices. However, this cutoff optical modulator has a large driving voltage and a high insertion loss. A large change in refractive index is required to cut off waveguiding, and an extinction ratio of about 20 dB can be obtained by generally applying a voltage of tens of volts or greater. Furthermore, the initial waveguiding conditions of an optical waveguide must be set near a cutoff area according to an operational principle, thus the insertion loss is large.

SUMMARY OF THE INVENTION

To solve the above problems, it is an object of the present invention to provide an optical intensity modulator having arc shaped waveguides for radiating an optical wave into a substrate by applying an external modulation signal to the curved waveguide when the optical wave passes through a predetermined location of the curved waveguides.

It is another object of the present invention to provide a fabrication method for the optical intensity modulator having arc shaped waveguides for radiating an optical wave to a substrate by applying an external modulation signal to the curved waveguides when the optical wave passes through a predetermined location of the curved waveguides.

Accordingly, to achieve the first object, there is provided an optical intensity modulator comprising: a substrate made of a predetermined material; an arc shaped optical waveguide formed on the substrate; and an electrode formed on the optical waveguide such that the electrode is in alignment with the optical waveguide, wherein the refractive index of the optical waveguide is changed with the intensity of an electric field applied to the electrode, and an optical wave passing through a predetermined location of the optical waveguide is radiated into the substrate due to the changed refractive index.

To also achieve the first object, there is provided another optical intensity modulator comprising: a lower cladding layer formed on a substrate made of a predetermined material; an optical waveguide formed of a material having a greater refractive index than the lower cladding layer, the optical waveguide formed in an arc shaped curve on the lower cladding layer; an upper cladding layer formed of the material of the lower cladding layer so as to cover the optical waveguide; and an electrode formed on the upper cladding layer such that the electrode is in alignment with the optical waveguide, wherein the refractive index of the optical waveguide is changed with the intensity of an electric field applied to the electrode, and an optical wave passing through a predetermined location of the optical waveguide is radiated into the substrate by the changed refractive index.

To achieve the second object, there is provided a method of fabricating an optical intensity modulator, comprising the steps of: depositing a lower cladding layer on a substrate; depositing a core layer having a refractive index greater than the refractive index of the lower cladding layer, on the lower cladding layer; forming an arc shaped optical waveguide by patterning the core layer and etching the core layer according to the pattern; depositing an upper cladding layer of the same material as the lower cladding layer to cover the optical waveguide; and forming a poling electrode on the upper cladding layer in alignment with the optical waveguide to pole the optical waveguide using an electrical field, and forming an upper electrode for applying an external modulation signal, on the poling electrode.

To also achieve the second object, there is provided another method of fabricating an optical intensity modulator, comprising the steps of: patterning an arc shaped optical waveguide on a substrate; masking all but an optical waveguide portion along the pattern, dipping the masked structure into a proton source solution, and exchanging the protons in the proton source solution with ions existing in the substrate; forming a curved optical waveguide by thermally treating the resultant structure for a given time; and forming an electrode on the curved optical waveguide.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1A:
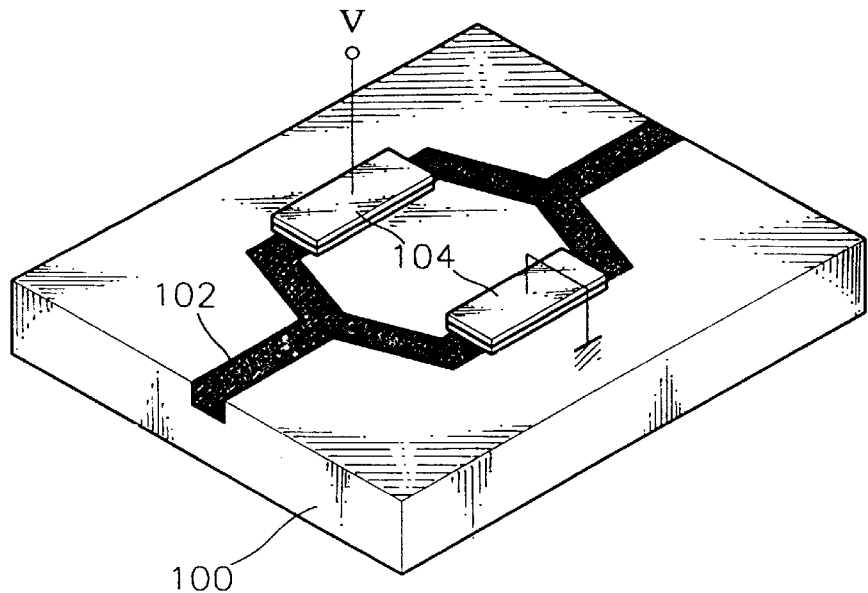
FIGS. 1A and 1B are perspective views of conventional optical modulators.

FIG. 1A illustrates the Mach-Zehnder interferometric modulator discussed in the Description of the Related Art above. The optical modulator of FIG. 1A is comprised of a substrate 100, an optical waveguide 102, and electrodes 104. The operation of this modulator has been previously described above.

Figure 1B:
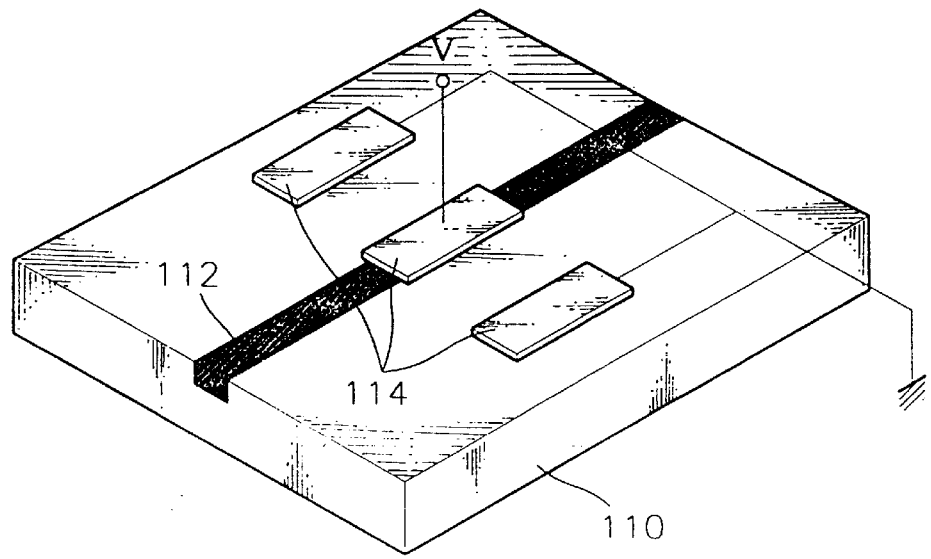

FIG. 1B illustrates the cutoff optical modulator discussed in the Description of the Related Art above and is comprised of a substrate 110, an optical waveguide 112, and electrodes 114.

Figure 2A:
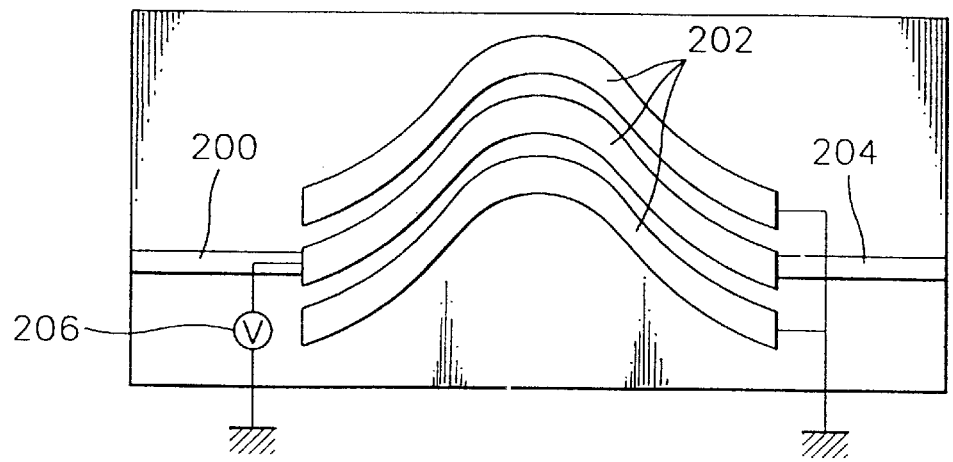
FIGS. 2A and 2B are plan views of optical intensity modulators according to the present invention.

FIG. 2A is a plan view of an electro-optic optical intensity modulator according to the present invention. The optical modulator of FIG. 2A includes an input waveguide 200, an electrode 202 comprised of at least one arc curve, an output waveguide 204, and a voltage source 206 for applying an electrical field to the electrode 202. When the electrode 202 is comprised of one arc shapedcurved electrode, the curved electrode is formed on the upper surface of a curved waveguide (not shown), a voltage is applied to the electrode 202, and a substrate (not shown) is grounded. When the electrode 202 is comprised of two or more arc shaped curved electrodes, the plural curved electrodes are formed on the upper surface of a curved waveguide and on the right and left side of the curved waveguide. A voltage is applied to the middle electrode, and the remaining electrodes are grounded. Electro-optical materials include, for example, semiconductors (GaAs, InP), ferroelectric (LiNbO$_3$, LiTaO$_3$), or poled polymers. The curved waveguide, one fan-shaped circular arc or a connection of a plurality of fan-shaped circular arcs having the same radius, is formed in a sine or cosine curve shape.

Figure 2B:
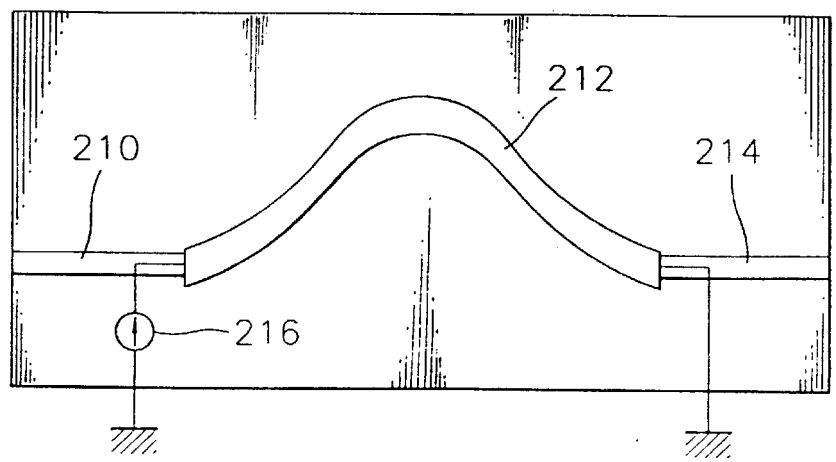

FIG. 2B is a plan view of a thermo-optic optical intensity modulator according to the present invention. The optical modulator of FIG. 2B includes an input waveguide 210, a micro-heater 212 formed of at least one arc shaped curve, an output waveguide 214, and a current source 216 for applying a current to the micro heater. When the micro-heater 212 is comprised of one arc shaped curve, the curved micro-heater 212 is formed on the upper surface of a curved waveguide. When the micro-heater 212 is comprised of a plurality of arc shaped curves, the plurality of arc curves are formed on the upper surface of a curved waveguide and on the right and left sides of the waveguide. Thermo-optical materials include, for example, semiconductors (GaAs, InP), ferroelectrics ($LiNbO_3$, $LiTaO_3$), and polymers or silica. The curved waveguide, the fan-shaped arc or a connection of a plurality of fan-shaped arcs having the same radius, is formed in a sine or cosine curve shape.

The operation of the optical intensity modulator according to the present invention is described as follows. After an optical wave input to the optical modulator forms a waveguiding mode while being guided along the input waveguide 200 or 210, and is then output to a curved waveguide (not shown). When there is no voltage or current applied from the voltage source 206 or the current source 216 to the electrode 202 or the micro-heater 212, the optical wave within the curved waveguide is output to the output waveguide 204 or 214 after passing through the curved waveguide. However, when a voltage or current is applied, the optical wave within the curved waveguide is both radiated into the substrate (not shown) and output to the output optical waveguide 204 or 214.

Figure 3:
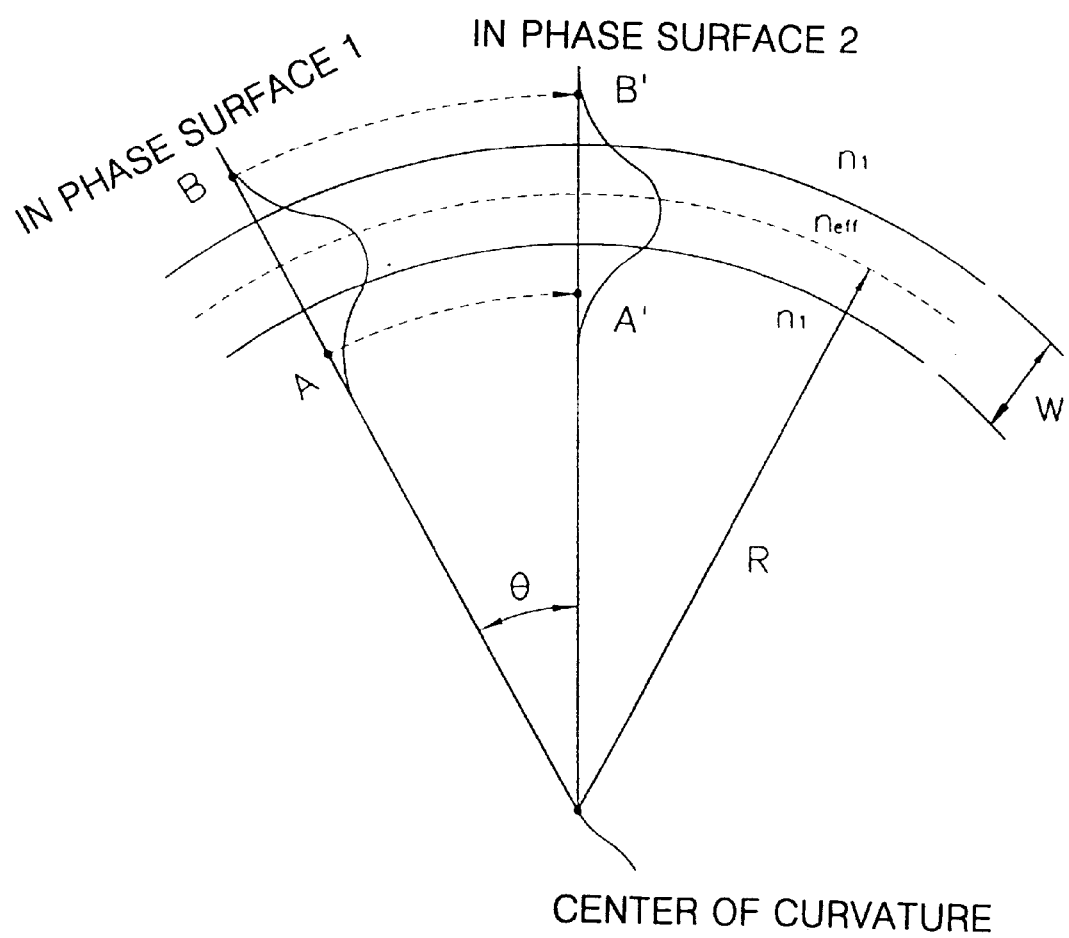
FIG. 3 illustrates the waveguiding principle of an optical wave traveling along the curved waveguide of FIG. 2A or 2B.

The operation of the above-described curved waveguide will now be described in more detail. FIG. 3 illustrates the waveguiding principle of an optical wave traveling along the curved waveguide of FIGS. 2A and 2B. Referring to FIG. 3, the curved waveguide is shaped into a circular arc having a radius R. If the radius R is sufficiently larger than the width W of an optical waveguide, the phase velocity of a guided optical wave approximates the tangent line velocity at a given point on the circular arc, as expressed by the following Equation 1:

$$v_p = \frac{c}{n_{\it eff}} = R \cdot \frac{d\theta}{dt} \quad (1)$$

wherein c represents the velocity of light in air, $n_{\it eff}$ represents the effective refractive index of a curved waveguide, and $\theta$ represents an angle at which an optical wave rotates along the curved waveguide.

That is, in order for an optical wave to pass through a curved waveguide without changing in shape, all points on an in-phase surface 1 should have the same angular velocity ($d\theta/dt$). If the optical wave is rotated by $\theta$ along the curved waveguide, all points on the in-phase surface 1 should be mapped to corresponding points on an in-phase surface 2. That is, point A must be mapped to point A', and point B must be mapped to point B'. In order to satisfy this condition, the tangent line velocity at a place radially x away from the center of the curved waveguide must be $(R+x)d\theta/dt$. However, this tangent line velocity cannot exceed a threshold light velocity ($c/n_1$) determined from the refractive index at the outside of the curved waveguide. A curve where the tangent line velocity and the threshold light velocity become the same is called a radiation caustic curve, and the radiation caustic curve $x_r$ is determined by the following Equation 2:

$$(R + X_r) \cdot \frac{d\theta}{dt} = \frac{c}{n_1} \quad (2)$$

-continued $$x_r = \frac{(n_{\it eff} - n_1)}{n_1} \cdot R$$

wherein $n_1$ denotes the refractive index of the substrate.

An optical wave passing through the points beyond the radiation caustic curve $x_r$ among points on an in-phase surface cannot rotate as fast as an optical wave passing through the points below $x_r$ rotates. Thus, an optical wave passing through the points beyond $x_r$ is left behind on the in-phase surface, and consequently radiated into a substrate.

Figure 4A:
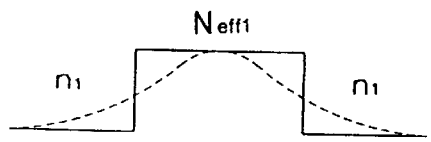
FIGS. 4A, 4B and 4C illustrate the relationship between a radiating caustic curve and the effective refractive index.
Figure 4B:
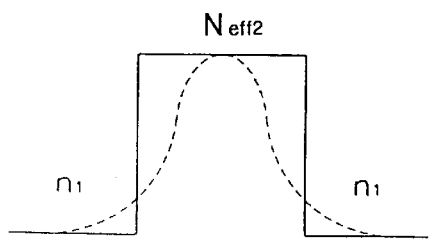
Figure 4C:
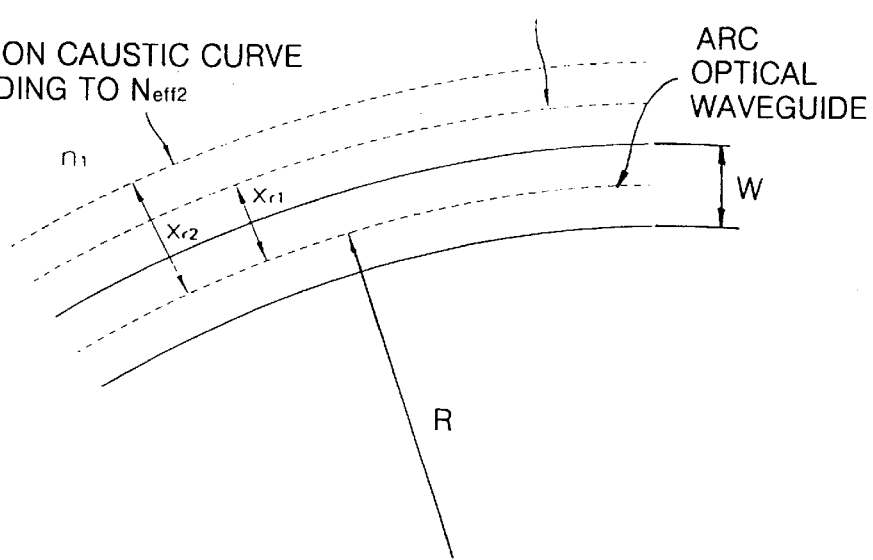

Referring to Equation 2, the radiation caustic curve of the curved waveguide is determined by the waveguiding condition. FIGS. 4A, 4B and 4C illustrate the relationship between a radiation caustic curve and the effective refractive index. In FIG. 4A where the difference between the effective refractive indices of the curved waveguide and the substrate is not large (that is, in case of bad guiding), the radiation caustic curve is close to the center of the waveguide as shown in FIG. 4C, thus the bending loss of an optical wave is increased. Conversely, in FIG. 4B where the effective refractive index of the curved waveguide is greater than that of the substrate (that is, in case of well guiding), the radiation caustic curve is distant from the center of the waveguide as shown in FIG. 4C, thus the bending loss of an optical wave is decreased. Accordingly, the position of the radiation caustic curve is moved by controlling the effective refractive index of the curved waveguide using an electric field when the curved waveguide is formed of an electro-optical material, or using heat when it is formed of a thermo-optical material. Therefore, the amount of bending loss of the curved waveguide can be controlled.

Figure 5A:
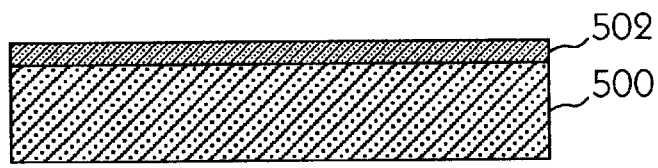
FIGS. 5A through 5G are cross-sectional views for illustrating a fabrication method of an electro-optical optical intensity modulator according to the present invention.
Figure 5B:
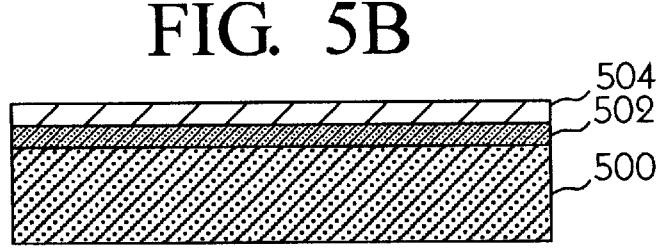
Figure 5C:
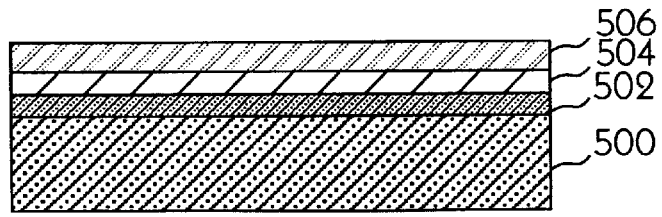
Figure 5D:
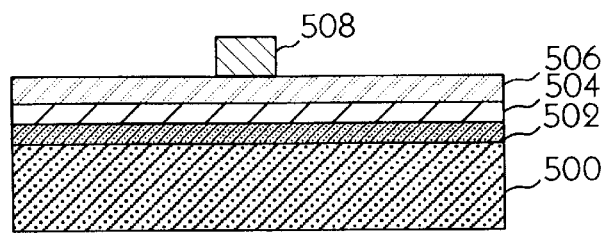
Figure 5E:
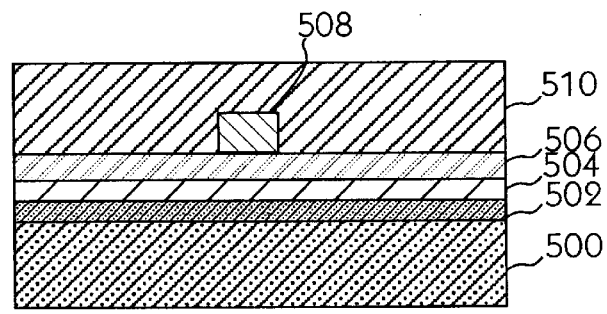

FIGS. 5A through 5G are cross-sectional views for illustrating a fabrication method of an electro-optic optical intensity modulator according to the present invention. First, a silica ($SiO_2$) insulative thin film layer 502 is deposited on a silicon substrate 500 as shown in FIG. 5A. In FIG. 5B, a metal layer (generally, Au or Cr) to be used as a lower electrode 504 is deposited on the silica thin film layer 502. In FIG. 5C, a lower cladding layer 506 is deposited on the lower electrode 504. In FIG. 5D, a core layer (not shown) having a greater refractive index than that of the lower cladding layer 506 is deposited on the lower cladding layer 506 then patterned and etched, thereby forming an arc optical waveguide 508 as described above. In FIG. 5E, an upper cladding layer 510 is formed on the lower cladding layer 506 and the optical waveguide 508. The optical waveguide 508, one fan-shaped arc or a connection of a plurality of fan-shaped arcs having the same radius, is formed in a sine or cosine curve shape.

Figure 5F:
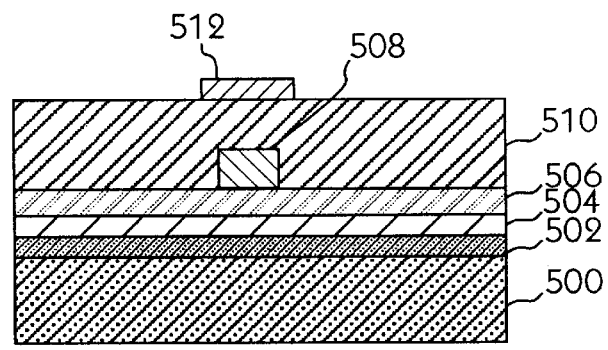
Figure 5G:
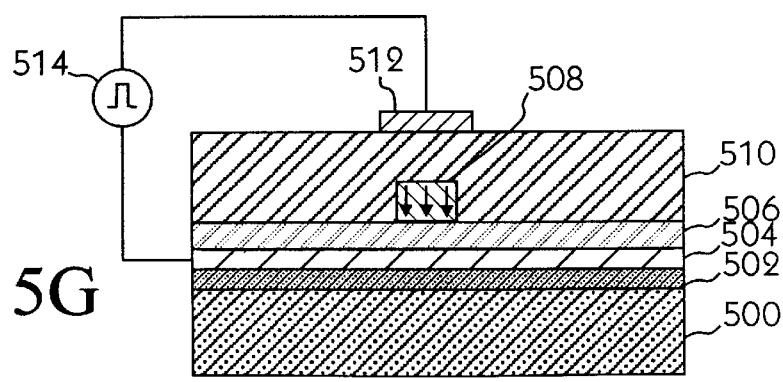

In FIG. 5F, a poling electrode 512 is formed on the optical waveguide 508 and the upper cladding layer 510. In FIG. 5G, the optical waveguide 508 is electrical-field poled by applying a strong electric field between the poling electrode 512 and the lower electrode 504 using a voltage source 514. The electrical-field poled polymer has an electro-optical effect. The latitudinal guiding of the optical waveguide 508 is obtained by etching all but the optical waveguide using a dry etch method during formation of the core layer. In this case, the poling electrode 512 is preferable to be aligned with the optical waveguide 508 to achieve effective electric field poling. Here, part of the poling electrode 512 can be used as an upper electrode (not shown) for applying an external modulation signal. There is an alternative method of selectively lowering the refractive index by optical-bleaching all but the optical waveguide after electrical field poling. In this case, a special upper electrode is needed.

Figure 6A:
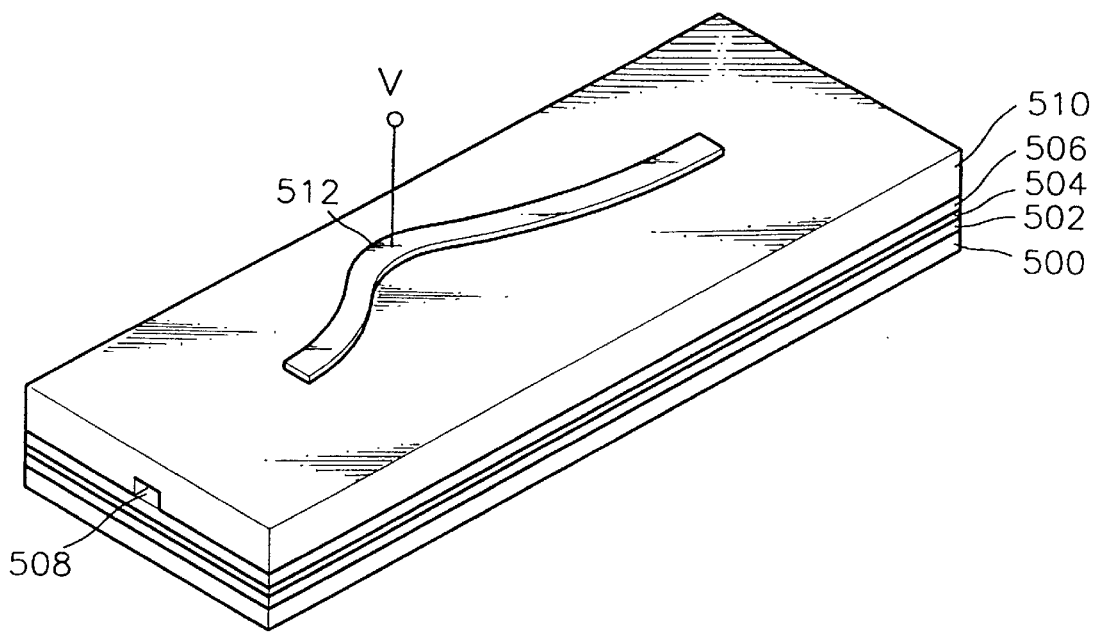
FIGS. 6A and 6B are structural perspective views of electro-optical optical intensity modulators according to the present invention.

FIG. 6A is a structural perspective view of a polymer electro-optic optical intensity modulator completed through the steps of FIGS. 5A through 5G. The reference numerals in FIG. 6A are the same as those shown in FIGS. 5A through 5G.

Figure 6B:
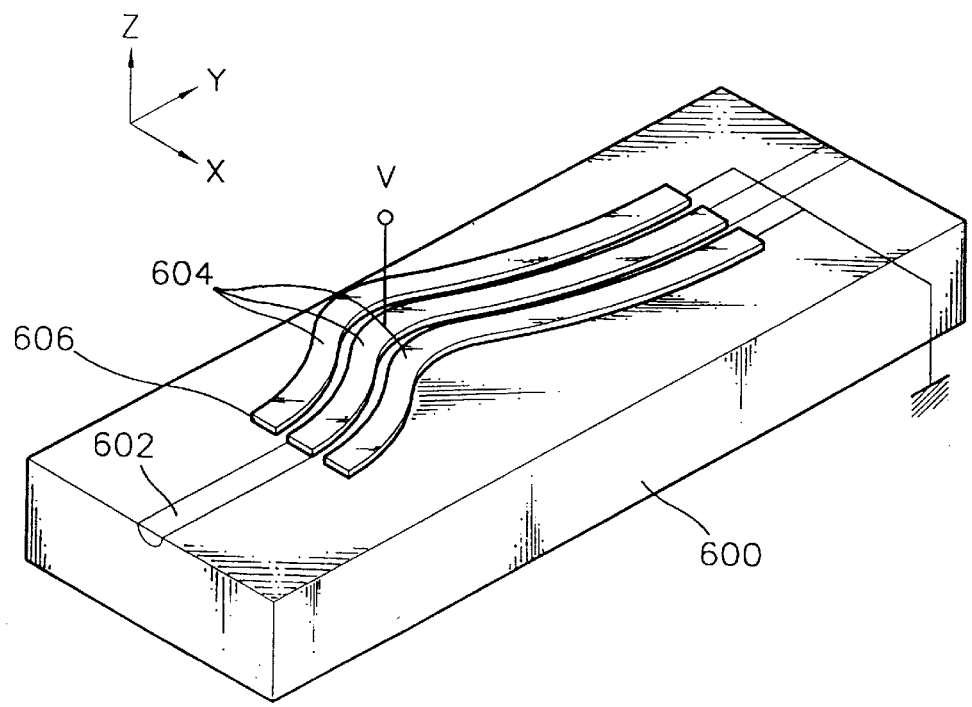

FIG. 6B is a structural perspective view of a ferroelectric electro-optic optical intensity modulator. Lithium naobate LiNbO$_3$ or lithium tantalate LiTaO$_3$ is suitable for the ferroelectric material of a substrate 600. A single crystal ferroelectric substrate does not require a special electric field poling process since it has an electro-optical effect. An optical waveguide 602 is fabricated through a proton exchanging method, an internal titanium (Ti) diffusion method, or a mixed method of titanium diffusion and proton exchange, when the substrate 600 is formed of LiNbO$_3$. Preferably, when the substrate 600 is formed of LiTaO$_3$, the optical waveguide 602 is fabricated using a low temperature proton exchange method rather than a high-temperature titanium diffusion method since the curie temperature of crystal is about 600° C. In the proton exchange method, an arc shaped optical waveguide on a substrate is patterned, and all but an optical waveguide portion is masked. Next, the resultant structure is dipped into a predetermined proton source solution, protons in the proton source solution are exchanged with lithium (Li) ions existing in the substrate, and the resultant structure is then thermally treated. In this way, a curved optical waveguide is formed. In the titanium diffusion method, the curved optical waveguide is patterned, and titanium is fused onto the patterned portion, thereby diffusing titanium.

The optical waveguide 602, one fan-shaped arc or a connection of a plurality of fan-shaped circular arcs having the same radius, is formed in a sine or cosine curve shape. After the formation of the optical waveguide, electrodes 604 for applying an external modulation signal is formed in alignment with the optical waveguide. Here, a silica buffer layer 606 is formed between the electrodes 604 and the optical waveguide 602 to prevent a waveguiding mode from having a loss by the electrodes.

Figure 7A:
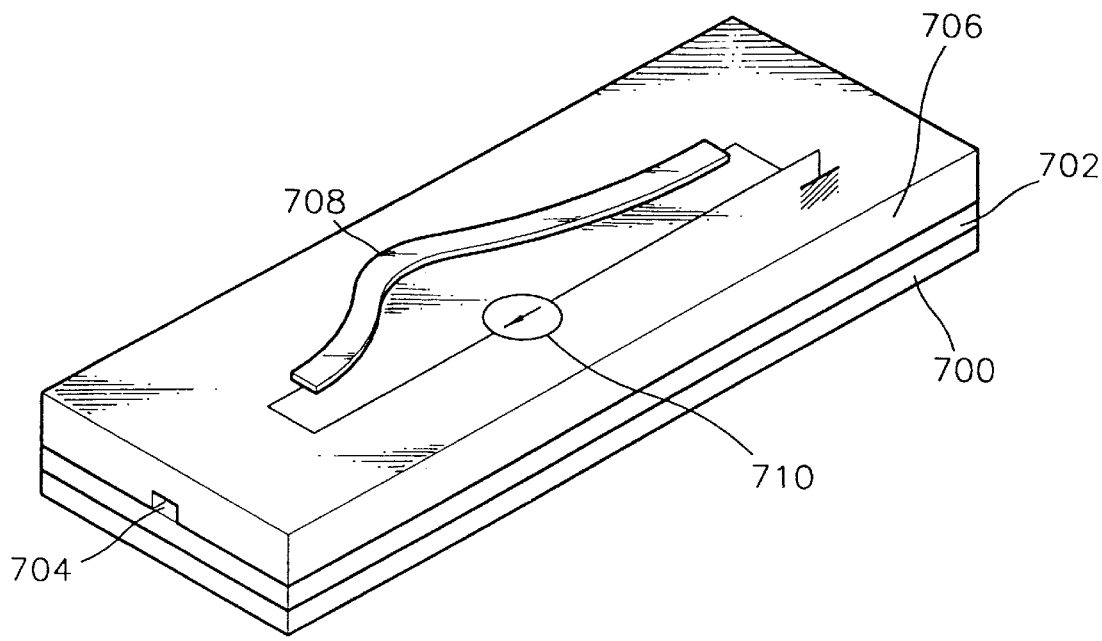
FIGS. 7A and 7B are structural perspective views of thermo-optic optical intensity modulators according to the present invention.

FIG. 7A is a structural perspective view of a polymer thermo-optic optical intensity modulator according to the present invention. The optical intensity modulator of FIG. 7A includes a silicon substrate 700, a lower cladding layer 702, an optical waveguide 704, an upper cladding layer 706, and a micro-heater 708. Reference numeral 710 represents a current source for applying a current to the micro-heater 708. The fabrication method of the thermo-optic optical intensity modulator is the same as that of the electro-optic optical intensity modulator except for a process for producing an electro-optical coefficient. After formation of the optical waveguide 704, the micro-heater 708 for applying an external modulation signal is formed in alignment with the optical waveguide 704.

Figure 7B:
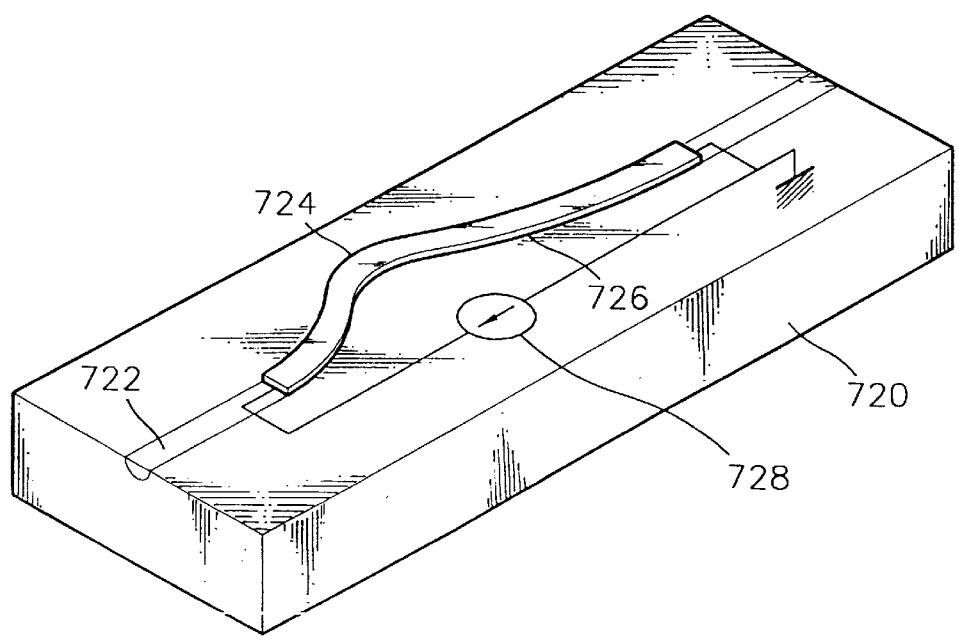

FIG. 7B is a structural perspective view of a ferroelectric thermo-optic optical intensity modulator according to the present invention. The optical intensity modulator of FIG. 7B includes a substrate 720 made of a ferroelectric material such as LiNbO$_3$ or LiTaO$_3$, a diffusion-type optical waveguide 722, a micro-heater 724 made of Au or Cr, and a silica buffer layer 726 formed between the micro-heater 724 and the optical waveguide 722. Reference numeral 728 represents a current source for applying a current to the micro-heater 724.

Figure 8A:
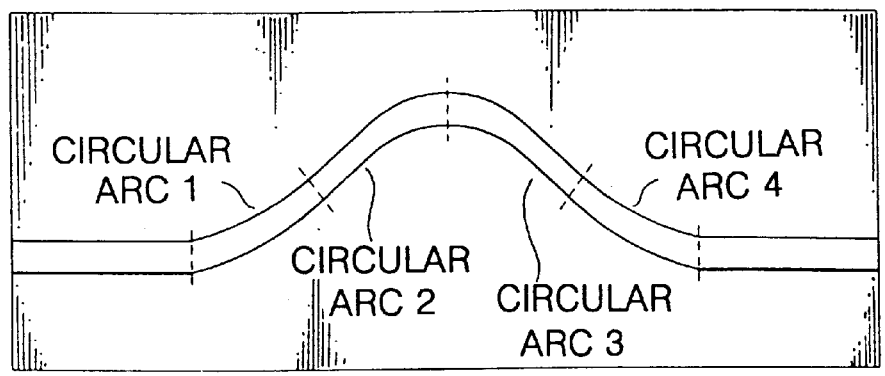
FIGS. 8A and 8B show the structure of a curved waveguide to ascertain the operation of an optical modulator according to the present invention.
Figure 8B:
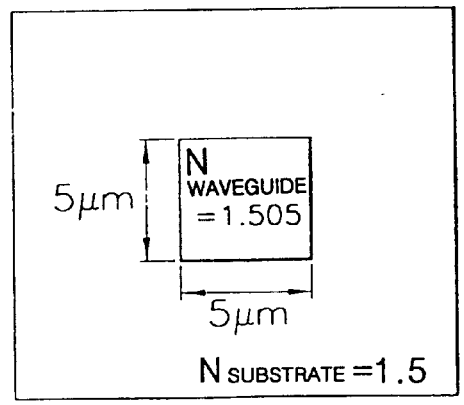

FIGS. 8A and 8B show the structure of curved waveguides to verify the operation of an optical modulator according to the present invention when it is numerically simulated using an effective refractive index method and a finite difference beam propagation method. Here, FIG. 8A shows a curved optical waveguide comprised of four circular arcs each having a radius of 30 mm, and FIG. 8B shows a cross-section of an optical waveguide. In the optical waveguide of FIG. 8B, the refractive index of the substrate is 1.5, the refractive index of the optical waveguide is 1.505, the width and height of the optical waveguide are 5 $\mu$m, and the wavelength of light used is 1.55 $\mu$m.

Figure 9:
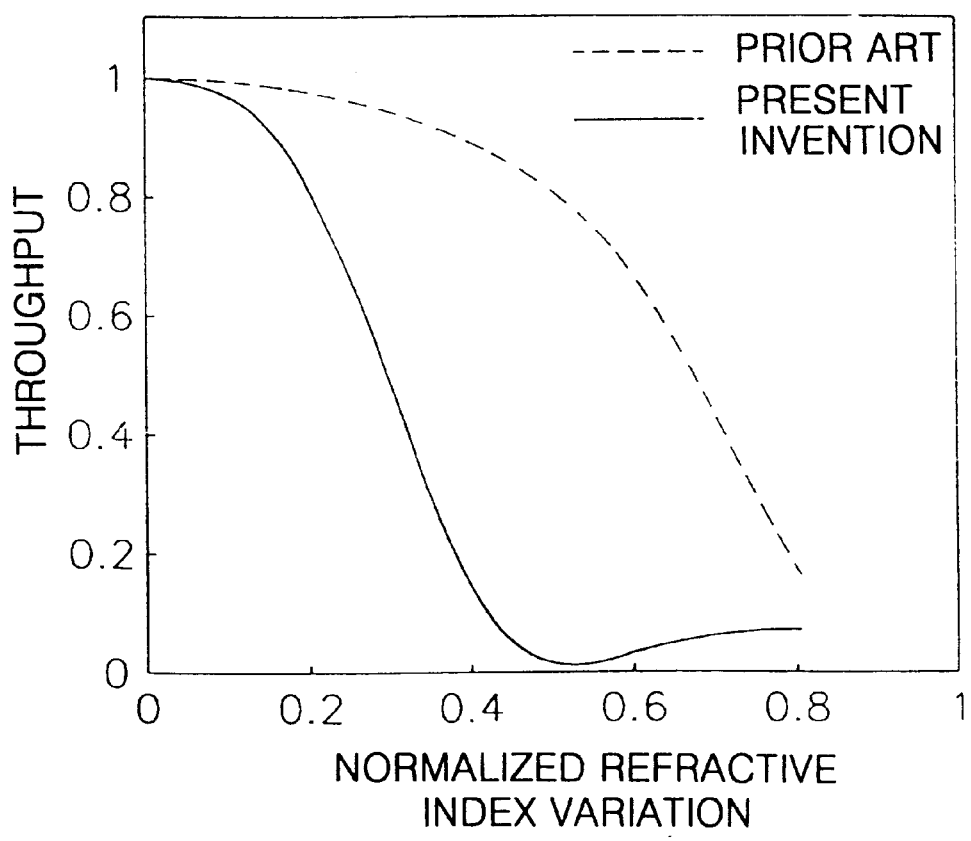
FIG. 9 is a graph showing the results of numerical simulation performed on an optical modulator having the optical waveguide of FIG. 8A and 8B.

FIG. 9 is a graph showing the results of numerical simulation performed on an optical modulator having the optical waveguide shown in FIGS. 8A and 8B. The horizontal axis represents the refractive index variation due to an external modulation signal normalized by the refractive index difference of the optical waveguide (refractive index of optical waveguide−refractive index of substrate). The vertical axis represents the throughput of the optical wave. A dotted line represents the results of a conventional optical modulator, and a solid line represents the results of an optical modulator according to the present invention. As shown in FIG. 9, an optical modulation depth of about 20 dB can be obtained from a refractive index variation corresponding to only 50% of the refractive index difference of the optical waveguide for the optical modulator according to the present invention. However, an optical modulation depth of only 0.94 dB can be obtained for the conventional optical modulator.

According to the present invention, a large modulation depth can be obtained from only a small refractive index variation by using the radiation loss characteristics of an arc waveguide. Also, since there is no need to completely cut off the optical waveguide, an initial optical waveguide can be set to a well guiding state. Thus, the insertion loss is small, and the driving voltage is low.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical intensity modulator comprising:

a substrate of a predetermined material;

an optical waveguide having a semicircular shaped path disposed on the substrate; and an electrode disposed on the optical waveguide such that the electrode is in alignment with the optical waveguide;

a refractive index of the optical waveguide being changed is accordance with an intensity of an electric field applied to the electrode, and an optical wave passing through a predetermined location of the optical waveguide being radiated into the substrate due to the changed refractive index thereof.

2. The optical intensity modulator of claim 1, the material of the substrate comprising an electro-optical material having a refractive index which varies in accordance with an intensity of an electric field applied thereto.

3. The optical intensity modulator of claim 1, the material of the substrate comprising a thermo-optical material having a refractive index which varies in response to a heating of the electrode in accordance with an intensity of an electric field applied thereto.

4. The optical intensity modulator of claim 1, the predetermined location $x_r$ of the optical waveguide varying with respect to R by $n_{eff}$ as expressed by the following equation:

$$x_r = \frac{(n_{eff} - n_1)}{n_1} \cdot R$$

wherein $n_{eff}$ denotes the changed refractive index of the optical waveguide, $n_1$ denotes the refractive index of the substrate, and R denotes a radius of the arc.

5. The optical intensity modulator of claim 4, the material of the substrate comprising an electro-optical material having a refractive index which varies in accordance with an intensity of an electric field applied thereto.

6. The optical intensity modulator of claim 4, the material of the substrate comprising a thermo-optical material having a refractive index which varies in response to a heating of the electrode in accordance with an intensity of an electric field applied thereto.

7. The optical intensity modulator of claim 1, the electrode further comprising a plurality of electrodes disposed on both lateral sides of the waveguide for generating a horizontal electric field component.

8. An optical intensity modulator, comprising:
a lower cladding layer formed on a substrate of a predetermined material;
an optical waveguide formed of a material having a greater refractive index than that of the lower cladding layer, the optical waveguide having a semicircular shaped path on the lower cladding layer;
an upper cladding layer formed of the material of the lower cladding layer so as to cover the optical waveguide; and
an electrode formed on the upper cladding layer so as to be in alignment with the optical waveguide;
the refractive index of the optical waveguide being changed in accordance with an intensity of an electric field applied to the electrode, and an optical wave passing a predetermined location of the optical waveguide being radiated into the substrate due to the changed refractive index.

9. The optical intensity modulator of claim 8, the material of the substrate comprising an electro-optical material whose refractive index varies in accordance with an intensity of an electric field applied thereto.

10. The optical intensity modulator of claim 8, the material of the substrate comprising a thermo-optical material whose refractive index varies in response to the heating of the electrode according to the intensity of the applied electrical field.

11. The optical intensity modulator of claim 8, the predetermined location $x_r$ of the optical waveguide varying with respect to R by $n_{eff}$ as expressed by the following equation:

$$x_r = \frac{(n_{eff} - n_1)}{n_1} \cdot R$$

wherein when $n_{eff}$ denotes the changed refractive index of the optical waveguide, $n_1$ denotes the refractive index of the substrate, and R denotes a radius of the arc.

12. The optical intensity modulator of claim 11, the material of the substrate comprising an electro-optical material whose refractive index varies in accordance with an intensity of an electric field applied thereto.

13. The optical intensity modulator of claim 11, the material of the substrate comprising a thermo-optical material whose refractive index varies in response to the heating of the electrode according to the intensity of the applied electrical field.

14. The optical intensity modulator of claim 8, the electrode further comprising a plurality of electrodes disposed on both lateral sides of the waveguide for generating a horizontal electric field component.

15. A method of fabricating an optical intensity modulator, comprising the steps of:
depositing a lower cladding layer on a substrate;
depositing a core layer having a refractive index greater than a refractive index of the lower cladding layer, on the lower cladding layer;
forming an optical waveguide having a semicircular path by patterning the core layer and etching the core layer according to the pattern;
depositing an upper cladding layer of the same material as the lower cladding layer to cover the optical waveguide; and
forming a poling electrode on the upper cladding layer in alignment with the optical waveguide to pole the optical waveguide using an electrical field, and forming an upper electrode for applying an external modulation signal, on the poling electrode.

16. The method of claim 15, further comprising forming a buffer layer disposed between the cladding layer and the upper electrode to prevent the loss of a waveguide mode due to the electrode.

17. A method of fabricating an optical intensity modulator, comprising the steps of:
patterning an arc shaped optical waveguide on a substrate;
masking all but an optical waveguide portion along the pattern, dipping the masked structure into a proton source solution, and exchanging the protons in the proton source solution with ions existing in the substrate;
forming a curved optical waveguide by thermally treating the resultant structure for a given time; and
forming an electrode on the curved optical waveguide.

18. The method of claim 17, further comprising forming a buffer layer between the curved optical waveguide formation step and the electrode formation step to prevent the loss of a waveguide mode due to the electrode.

19. The method of claim 18, further comprising forming a buffer layer between the curved optical waveguide formation step and the electrode formation step to prevent the loss of a waveguide mode due to the electrode.

20. A method of fabricating an optical intensity modulator, comprising the steps of:
patterning an arc shaped optical waveguide on a substrate;
forming the arc shaped optical waveguide by fusing a predetermined material onto the patterned curved optical waveguide and diffusing the material into the patterned arc optical waveguide; and
forming an electrode on the arc optical waveguide.

21. The method of claim 20, the predetermined material used in the curved optical waveguide formation step comprising titanium.

* * * * *